United States Patent [19]

Kobayakawa et al.

[11] Patent Number: 5,395,566
[45] Date of Patent: Mar. 7, 1995

[54] PHOTOCHROMIC COMPOSITION

[75] Inventors: Takashi Kobayakawa; Satoshi Imura; Kazumasa Itonaga; Kazuhiko Kuramoto, all of Tokuyama, Japan

[73] Assignee: Tokuyama Corporation, Tokuyama, Japan

[21] Appl. No.: 24,764

[22] Filed: Mar. 2, 1993

[30] Foreign Application Priority Data

Mar. 3, 1992 [JP] Japan ................. 4-045813

[51] Int. Cl.$^6$ .......................... G02B 5/23; C08F 2/00
[52] U.S. Cl. ..................... 252/586; 526/204
[58] Field of Search ............. 252/582, 586, 600; 526/204

[56] References Cited

U.S. PATENT DOCUMENTS

| | | | |
|---|---|---|---|
| 3,716,489 | 2/1973 | DeLapp | 252/586 |
| 3,725,292 | 4/1973 | Gerhardt | 252/586 |
| 4,892,438 | 11/1989 | Tanaka et al. | 252/586 |
| 5,106,998 | 4/1992 | Tanaka et al. | 252/586 |
| 5,130,058 | 7/1992 | Tanaka et al. | 252/586 |

*Primary Examiner*—Philip Tucker
*Attorney, Agent, or Firm*—Sherman and Shalloway

[57] ABSTRACT

A photochromic composition comprising (A) 100 parts by weight of a compound having at least one epoxy group in the molecule and (B) 0.0001 to 10,000 parts by weight of a photochromic compound. The compound (A) is represented by the following general formula

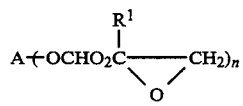

wherein A is a residue of an n-valent alcoholic hydroxyl-containing compound, a residue of an n-valent phenolic-hydroxyl-containing compound, or a residue of an n-valent carboxylic acid, $R^1$ is a hydrogen atom or a methyl group, and n is an integer of 1 to 4.

Examples of the (A) compound include alcoholic hydroxyl-containing compounds such as monohydric, dihydric or trihydric alcohols, reaction products of phenolic hydroxyl-containing compounds such as phenol or hydroquinone with epichlorohydrin, or reaction products of carboxylic acids such as benzoic acid, or terephthalic acid with epichlorohydrin. Examples of the (B) photochromic compound include fulgide compounds, spirooxazine compounds and chromene compounds. A polymer obtained by polymerizing the above photochromic composition of the invention by a radical polymerization method has a good durability of photochromic properties, and also possesses a dark color-forming density, a fast color fading speed, is transparent, and has a high surface hardness. Thus, especially, the polymer is suitable for use as a photochromic lens.

16 Claims, No Drawings

PHOTOCHROMIC COMPOSITION

DESCRIPTION OF THE INVENTION

1. Field of the Invention

This invention relates to a photochromic composition having an excellent durable photochromic action.

2. Description of the Related Art

Photochromism is a phenomenon, which has attracted attention for the past several years, denotes a phenomenon in which where light containing ultraviolet rays such as sunlight or a light from a mercury lamp is irradiated onto a certain compound, its color rapidly changes, and when the light irradiation is stopped and the compound is placed in a dark place, its color reversibly returns to the original color. Compounds having this property are called photochromic compounds. The photochromic compounds having various structures have been synthesized. However, these photochromic compounds have the defect that they have poor reversible durability.

The present inventors continued to study a series of photochromic compounds, and succeeded in synthesizing novel fulgide compounds and novel chromene compounds. They found that these compounds have an excellent photochromic action and already proposed these compounds. For example, the novel fulgide compounds are disclosed in U.S. Pat. Nos. 4,882,438, 4,960,678 and 5,130,058 and the novel chromene compounds are disclosed in U.S. Pat. No. 5,106,998.

These photochromic compounds show an excellent reversible durability. But when such a compound is mixed with a radical-polymerizable monomer and the mixture is polymerized, and the resulting photochromic resin may be used in various utilities, a better reversible durability of photochromic action is sought.

SUMMARY OF THE INVENTION

It is an object of this invention to provide a photochromic composition having good photochromic durability comprising a photochromic compound and another compound.

It is another object of this invention to provide a photochromic composition having a deep color-forming density and a fast color fading speed.

It is still other object of this invention to provide a photochromic resin having good photochromism, transparency and surface hardness.

It is a further object of this invention to provide a practicable photochromic lens.

We have continued to assiduously investigate the production of a photochromic resin typified by a photochromic lens by mixing a photochromic compound with a radical-polymerizable monomer and polymerizing the mixture. As a result, we have found that by using a photochromic compound conjointly with a compound having at least one epoxy group in the molecule, the durability of the photochromic action of the photochromic compound is increased, and this finding has led to the completion of the present invention.

The present invention is a photochromic composition comprising (A) 100 parts by weight of a compound having at least one epoxy group in the molecule and (B) 0.0001 to 10,000 parts by weight of a photochromic compound.

DETAILED DESCRIPTION OF THE PREFERRED EMBODIMENTS

The component (A) in this invention may be any known compounds having at least one epoxy group in the molecule. They include alcoholic hydroxyl group-containing compounds of monohydric, dihydric or trihydric alcohols, reaction products between phenolic hydroxyl compounds such as phenol and hydroquinone and epichlorohydrin, and reaction products between carboxylic acids such as benzoic acid and terephthalic acid and epichlorohydrin. These compounds may be represented by the following general formula.

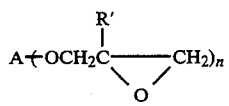

wherein A is a residue of an n-valent alcoholic hydroxyl compound, a residue of an n-valent phenolic hydroxyl group-containing compound, or a residue of an n-valent carboxylic acid, R is a hydrogen atom or a methyl group, and n is an integer of 1 to 4.

In the present invention, the component (A) preferably contains at least one radical polymerizable group in the molecule. By using a compound having a radical-polymerizable group and an epoxy group and by polymerizing a composition of the photochromic compound and this compound, the compound having at least one radical polymerizable group and at least one epoxy group is polymerized and fixed in the polymeric matrix. Therefore, if such a compound is used in a large amount, the properties of a photochromic resin will not be impaired.

Examples of such radical-polymerizable groups include generally a vinyl group, an allyl group, an acryloyl group, and a methacryloyl group. From the standpoint of obtaining good photochromic properties, acryloyl and methacryloyl groups are preferred.

Among the compounds having at least one epoxy group in the molecule and not having a radical-polymerizable group, examples of compounds preferably used in the present invention include those of the above formula wherein n is 1 or 2, when n is 1, A is an alkyl group having 2 to 20 carbon atoms which may be substituted by a hydroxyl group, a group represented by —R—(OR)$_m$—OH (in which R is an alkylene group having 2 to 4 carbon atoms and m is an integer of 1 to 20), a cycloalkyl group having 6 to 7 carbon atoms which may be substituted by a hydroxyl group, a phenyl group which may be substituted by a hydroxyl group, or a benzoyl group which may be substituted by a carboxyl group, when n is 2, A represents an alkylene group having 2 to 20 carbon atom which may be substituted by a hydroxyl group, a group shown by —R—(OR)$_m$— (in which R is an alkylene group having 2 to 4 carbon atoms and m is an integer of 1 to 20), a cycloalkylene group which may be substituted by a hydroxyl group, a phenylene group which may be substituted by a hydroxyl group, a phthaloyl group, an isophthaloyl group, a terephthaloyl group or a group shown by

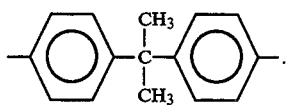

Examples of compounds containing at least one epoxy group and at least one radical-polymerizable group in the molecule which can be preferably used in this invention are represented by the following formula

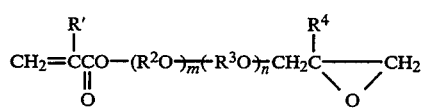

wherein $R^1$ and $R^4$ are a hydrogen atom or a methyl group, $R^2$ and $R^3$ are the same or different alkylene groups having 1 to 4 carbon atoms which may be substituted by a hydroxyl group, or a group of the following group

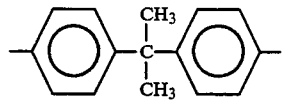

and m and n are 0 or 1.

Examples of the alkylene group represente by $R^2$ include a methylene group, an ethylene group, a propylene group, a butylene group, a trimethylene group and a tetramethylene group.

Preferred examples of the compound having at least one epoxy group in the molecule are specifically shown as follows: Compounds having at least one epoxy group in the molecule but not having a radical-polymerizable group include ethylene glycol glycidyl ether, propylene glycol glycidyl ether, glycerol polyglycidyl ether, diglycerol polyglycidyl ether, solbitol polyglycidyl ether, butyl glycidyl ether, phenyl glycidyl ether, polyethylene glycol diglycidyl ether, polypropylene glycol diglycidyl ether, neopentyl glycol diglycidyl ether, 1,6-hexane diol diglycidyl ether, bisphenol A or hydrogenated bisphenol A propylene oxide adduct, diglycidyl ester of terephthalic acid, spiroglycol diglycidyl ether and hydroquinone diglycidyl ether.

Examples of the compound having at least one radical-polymerizable group and at least one epoxy group in the molecule include methacrylate and acrylate compounds such as glycidyl acrylate, glycidyl methacrylate, β-methylglycidyl acrylate, β-methylglycidyl methacrylate, bisphenol A-monoglycidyl ether-methacrylate, 4-glycidyloxybutylmethacrylate, 3-(glycidyl-2-oxyethoxy)-2-hydroxypropylmethacrylate, 3-(glycidiloxy-1-isopropyloxy)-2-hydroxypropylacrylate and 3-(glycidyloxy-2-hydroxypropyloxy)-2-hydroxypopylacrylate. To increase the durability of the photochromic action, glycidyl methacrylate and glycidyl acrylate are preferred.

The photochromic compound as the component (B) of the photochromic composition of this invention may be any compound which shows a photochromic action. Photochromic compounds such as fulgide compounds, spirooxazine compounds, and chromene compounds are well known, and in the present invention, these photochromic compounds may be used. These fulgide compounds and chromene compounds are well known in U.S. Pat. Nos. 4,882,438, 4,960,678, 5,130,058, and 5,106,998 and can preferably be used.

In the present invention, the fulgide compounds have a larger ability to increase the durability of photochromic property than other compounds and therefore may preferably be used.

Fulgide compounds preferably used in this invention may be represented by the following formula (1).

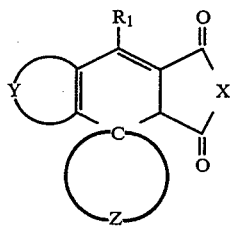

wherein

is a divalent aromatic hydrocarbon group or a divalent unsaturated heterocyclic group which may each have a subsituent, $R_1$ is an alkyl group, an aryl group, or a monovalent heterocyclic group,

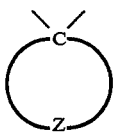

is a norbornylidene group or adamantylidene group, and X representes an oxygen atom group $>N-R_2$, group $>N-A_1-B_1-(A_2)_m-(B_2)_n-R_3$, group $>N-A_3-A_4$, or group $>N-A_3-R_4$ (where $R_2$ is a hydrogen atom, an alkyl group or an aryl group, $A_1$, $A_2$ and $A_3$ are the same or different and each represents an alkylene group, an alkylidene group, a cycloalkylene group, or an alkylcycloalkane-diyl group, $B_1$ and $B_2$ are the same or different and each represents —O—,

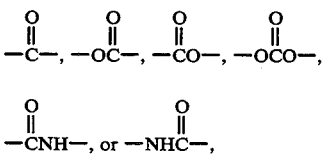

—CNH—, or —NHC—, m and n are independently 0 or 1 and when m is 0, n is 0, $R_3$ is an alkyl group, a naphthyl group, or a naphthylalkyl group, $A_4$ is a naphthyl group, and $R_4$ is a halogen atom, a cyano group or a nitro group.)

Examples of the divalent aromatic hydrocarbon group shown by

in the formula (1) may be divalent groups derived from one benzene group and fused rings of 2 or 3 benzene rings. Examples of the divalent unsaturated heterocyclic ring group include divalent groups derived from 5- to 7-membered rings having 1 to 2 oxygen atoms, nitrogen atoms or sulfur atoms as ring-constituting atoms, or fused rings of said ring and a benzene ring. Specific examples of the divalent aromatic hydrocarbon groups include groups having 6 to 14 carbon atoms derived from a benzene ring, a naphthalene ring, a phenanthrene ring, an anthracene ring, etc. Specific examples of the divalent unsaturated heterocyclic groups include divalent groups having 4 to 9 carbon atoms derived from a furan ring, a benzofuran ring, a pyridine ring, a quinoline ring, an isoquinoline ring, a pyrrole ring, a thiophene ring, a benzothiophene ring, etc.

Substituents of these groups are not particularly limited and may include halogen atoms such as chlorine, bromine and iodine, alkyl groups having 1 to 4 carbon atoms such as a methyl group and an ethyl group, alkoxy groups having 1 to 4 carbon atoms such as a methoxy group and an ethoxy group, aryl groups having 6 to 10 carbon atoms such as a phenyl group, a tolyl group and a xylyl group, alkoxyaryl groups having 7 to 14 carbon atoms (aryl groups having 6 to 10 carbon atoms substitued by alkoxy groups having 1 to 4 carbon atoms), amino group, nitro group, and cyano group.

Examples of the alkyl group, the aryl group and the heterocyclic group represented by $R_1$ include monovalent groups such as alkyl groups having 1 to 4 carbon atoms, aryl groups having 6 to 10 carbon atoms, and monovalent groups derived from a 5- to 7-membered ring containing 1 to 2 oxygen atoms, nitrogen atoms or sulfur atoms as ring-constituting atoms or fused rings of the multi-membered ring and a benzene ring.

Examples of the alkyl group, the aryl group shown by $R_2$ in formula (1) are the same as $R_1$. Examples of the alkylene groups represented by $A_1$, $A_2$ and $A_3$ are preferably those having 1 to 4 carbon atoms such as a methylene group, an ethylene group, a propylene group, a trimethylene group, and a tetramethylene group. Examples of the alkylidene group are preferably those having 2 to 4 carbon atoms such as an ethylidene group, a propylidene group, and an isopropylidene group. Example of the cycloalkylene group is preferably the cyclohexylene group. Example of the alkylcycloalkanediyl group is preferably a dimethylcyclohexane-diyl group.

The alkyl group represented by $R_3$ in general formula (1) is the same as $R_1$. Preferred naphthylalkyl groups include those having 11 to 14 carbon atoms, such as a naphtylmethyl group and a naphthyl ethyl groups.

Among the fulgide compounds shown by the above formula, in view of the durability of the photochromic action, compounds of formula (1) wherein $R_1$ is an alkyl group, X is >N—R in which R is a cyano-alkyl group having 1 to 4 carbon atoms, nitro-alkyl group having 1 to 4 carbon atoms or an alkoxycarbonyl-alkyl group having 3 to 9 carbon atoms (containing an alkoxy group containing 1 to 4 carbon atoms and an alkylene group having 1 to 4 carbon atoms),

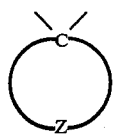

is an adamantylidene group, and

is a heterocyclic group, especially a group derived from a thiophene ring, which may be substituted by an aryl group having 6 to 10 carbon atoms or an alkoxyaryl group having 7 to 14 carbon atoms (an aryl group having 6 to 10 carbon atoms which is substituted by an alkoxy group having 1 to 4 carbon atoms) are preferred.

When the photochromic compound is used as an eyeglass lens, a color such as grey or brown is preferred. Since such a single photochromic compound cannot give such a color, a method of mixing two or more photochromic compounds may be adopted. The above-mentioned fulgide compound is generally colored in orange to blue. When it is mixed with the chromene compound which is colored in yellow to orange, an intermediate color such as grey and brown may be obtained. Since the aforesaid fulgide compound has a poor durability of photochromic properties as compared with the chromene compound, changes may occur in color with the lapse of time. For this reason, a mixed color of the fulgide compound and the chromene compound changes with time. However, in accordance with this invention, by increasing the durability of photochromism of the fulgide compound, it is made close to the durability of the chromene compound, and a divergence in color with the lapse of time can be minimized.

The chromene compound preferably used in admixture with the fulgide compound to obtain an intermediate color may be represented by formula (2).

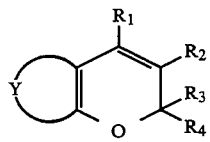

(2)

wherein $R_1$, $R_2$, $R_3$ and $R_4$ are the same or different, and each represents a hydrogen atom, an alkyl group, an aryl group, a substituted amino group or a saturated heterocyclic group, $R_3$ and $R_4$ may together form a ring, and the group

is an aromatic hydrocarbon group or an unsaturated heterocyclic group which may be substituted by an alkyl group having 1 to 20 carbon atoms or an alkoxy group having 1 to 20 carbon atoms.

Examples of the alkyl and aryl groups represented by $R_1$, $R_2$, $R_3$ and $R_4$ in formula (2) may be the alkyl and aryl groups described above with regard to formula (1). Examples of the substituted amino group may be amino groups whose at least one hydrogen atom is substituted by the aforesaid alkyl or aryl group. Examples of the saturated heterocyclic group include monovalent groups derived from 5 to 6-membered rings containing 1 to 2 ring-constituting atoms such as nitrogen atoms, oxygen atoms and sulfur atoms such as a pyrrolidine group, an imidazolidine ring, a piperidine ring, a piperazine ring and a morphorine ring.

Examples of the ring formed by $R_3$ and $R_4$ in formula (2) include a norbornylidene group and a bicyclo (3,3,1,)9-nonylidene group.

The aromatic hydrocarbon group or the unsaturated heterocyclic group represented by

in the formula (2) may be the same as those shown in formula (1). Substituents of these groups are not particularly limited. Examples of the substituents include halogen atoms such as chlorine, bromine and iodine, alkyl groups having 1 to 20 carbon atoms such as a methyl group and an ethyl group, alkoxy groups having 1 to 20 carbon atoms such as a methoxy group and an ethoxy group, aryl groups having 6 to 10 carbon atoms such as a phenyl group, a tolyl group and a xylyl group, amino groups, a nitro group, and a cyano group.

Examples of the chromene compounds preferably used in this invention include those of formula (2) in which $R_1$ and $R_2$ are both hydrogen atoms, $R_3$ and $R_4$ are same or different alkyl groups having 1 to 4 carbon atoms, or together may form a bicyclo(3,3,1)9-nonylidene group or a norbornylidene group,

is a naphthalene ring which may be substituted by an alkyl group having 1 to 20 carbon atoms or an alkoxy group having 1 to 20 carbon atoms.

The fulgide compounds and the chromene compounds that can be used preferably in this invention are listed below.

FULGIDE COMPOUNDS

1) N-cyanomethyl-6,7-dihydro-4-methyl-2phenyl-spiro(5,6-benzo(b)thiophenedicarboximide-7,2tricyclo(3,3,1,1$^{3.7}$)decane
2) N-cyanomethyl-6,7-dihydro-2-(p-methoxyphenyl)-4-methylspiro(5,6-benzo(b)thiophene/dicarboximide-7,2-tricyclo(3,3,1,1$^{3.7}$)decane
3) N-cyanomethyl-6,7-dihydro-4-methyl-spiro(5,6-benzo(b)thiophenedicarboximide-7,2-tricyclo(3,3,1,1$^{3.7}$)-decane
4) 6,7-Dihydro-N-methoxycarbonylmethyl-4-methyl-2-phenylspiro(5,6-benzo(b)thiophene/dicarboximide-7,2-tricyclo(3,3,1,1$^{3.7}$)decane
5) 6,7-Dihydro-4-methyl-2-(p-methylphenyl)-N-nitromethylspiro(5,6-benzo(b)thiophenedicarboximide-7,2-tricyclo(3,3,1,1$^{3.7}$)decane

CHROMENE COMPOUNDS

1) Spiro(norbornane-2,2'-(2H)benzo(h)-chromene)
2) Spiro(bicyclo(3,3,1)nonane-9,2'-(2H)benzo(f)chromene)
3) 7'-methoxyspiro(bicyclo(3,3,1)nonane-9,2'-(2H)benzo(f)chromene)
4) 7'-methoxyspiro(norbornane-2,2'-(2H)benzo(f)chromene)
5) 2,2-Dimethyl-7-octoxy(2H)benzo(h)-chromene In the photochromic composition of this invention, the durability of it photochromic action can be fully increased by the presence of even a slight amount of a compounds having at least one epoxy group in the molecule. Accordingly, the amounts to be compounded of the compound having at least one epoxy group in the molecule and the photochromic compound may be employed within wide ranges. However, if the amount of the photochromic compound is too small based on the compound having at least one epoxy group in the molecule, a good durability of photochromic property cannot be obtained. If it is too large, coagulation of the photochromic compound occurs, and the durability of the photochromic property abruptly decreases. Accordingly, the photochromic compound is usually used in an amount of 0.0001 to 10,000 parts by weight, preferably in an amount of 0.1 to 1,000 parts by weight, per 100 parts by weight of the compound having at least one epoxy group in the molecule.

In the production of an eyeglass lens from the photochromic composition of this invention, a monomer is further mixed and the mixture may be polymerized. When a compound having at least one polymerizable group and at least one epoxy group in the molecule is used as the compound having at least one epoxy group in the molecule, another monomer is not at all required particularly. To obtain an eyeglass lens having good properties, it is preferred to use a mixture of a compound having at least one polymerizable group and at least one epoxy group in the molecule with a monomer copolymerizable therewith.

The above monomer may be any radical-polymerizable monomer. Examples of the radical-polymerizable monomer are acrylates and methacrylates such as methyl acrylate, methyl methacrylate, benzyl methacrylate, phenyl methacrylate, tribromophenyl methacrylate, ethylene glycol diacrylate, diethylene glycol dimethacrylate, triethylene glycol dimethacrylate, tetraethylene glycol dimethacrylate, 2-hydroxyethyl methacrylate, bisphenol A dimethacrylate, 2,2-bis(4-methacryloyloxyethoxyphenyl)propane; and aromatic vinyl compounds such as styrene, chlorostyrene, α-methylstyrene, vinylnaphthalene, isopropenylnaphthalene, bromostyrene and divinylbenzene. These monomers may be used singly or as a mixture of at least two of them.

The amount of the radical-polymerizable monomer depends upon the color-forming density of the photochromic resin obtained by polymerization but is 10 to 100,000 parts by weight preferably 100 to 10,000 parts by weight per 100 parts by weight of the compound containing at least one epoxy group in the molecule.

By using a combination of the compounds shown by general formulae (I) and (II) given below as the radical-polymerizable monomer, a deep color-forming density and a fast fading speed of the photochromic compound can be obtained. The use of a combination of these compounds (I) and (II) is preferred because photochromic resins having practicable properties such as good transparency, surface hardness and heat resistance can be obtained.

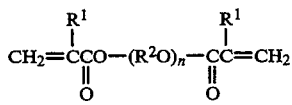

wherein $R^1$ is a hydrogen atom or a methyl group, and $R^2$ is an alkylene group having 1 to 4 carbon atoms, or a group represented by the following formula

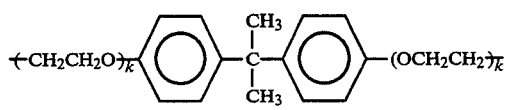

wherein k is 0 or 1, and n is an integer of 2 to 20,

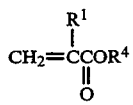

wherein $R^1$ is a hydrogen atom or a methyl group, and $R^4$ is an alkyl group having 1 to 4 carbon atoms which may be substituted by a hydroxyl group, an aryl group having 6 to 10 carbon atoms which may be substituted by a halogen atom, or an aralkyl group having 7 to 10 carbon atoms which may be substituted by a halogen atom.

Examples of the alkylene group having 1 to 4 carbon atoms represented by $R^2$ in the formulae (I) and (II) include a methylene group, an ethylene group, a propylene group, a butylene group, a trimethylene group, and a tetramethylene group. Examples of the alkyl groups having 1 to 4 carbon atoms which may be substituted by a hydroxyl group represented by $R^4$ include a methyl group, an ethyl group, a propyl group, a butyl group, a hydroxyethyl group and a hydroxypropyl group. Examples of the aryl groups having 6 to 10 carbon atoms which may be substituted by a halogen atom represented by $R^4$ include a phenyl group, a naphthyl group, a chlorophenyl group, a bromophenyl group, a trichlorophenyl group, and a tribromophenyl group. Example of the aralkyl groups having 7 to 10 carbon atoms which may be substituted by a halogen atom include a benzyl group, a phenethyl group, a chlorobenzyl group, a bromobenzyl group, a trichlorobenzyl group, and a tribromobenzyl group.

From the view point of photochromic property and other properties, the amount of the monomer represented by the formula (I) is 1 to 99,999 parts by weight per 100 parts by weight of the compound conaining at least one epoxy group in the molecule, and the amount of the monomer represented by the formula (II) is 1 to 99,999 parts by weight per 100 parts by weight of the compound containing at least one epoxy group in the molecules. The total amount of the monomer represented by general formula (I) and the monomer represented by general formula (II) is 10 to 100,000 parts by weight. Furthermore, it is preferred to use 50 to 9,950 parts by weight of the monomer of general formula (I) and 50 to 9,950 parts by weight of the monomer of general formula (II). The total amount of the monomer of general formula (I) and the monomer of general formula (II) is 100 to 10,000 parts by weight.

A method of obtaining a polymer from the photochromic composition of this invention is not particularly limited, and any known radical polymerization methods may be used. Polymerization initiation means may be performed by using various radical polymerization initiators such as various peroxides or azo compounds, or by the irradiation of ultraviolet rays, $\alpha$-rays, $\beta$-rays, and $\gamma$-rays, or by both. A typical polymerization method comprises pouring the photochromic composition of the invention containing a radical polymerization initiator and if further required a radical-polymerizable monomer between molds maintained by an elastomer gasket or a spacer, polymerizing them in a heating furnace, and then taking out the molds to perform cast molding.

The radical polymerization initiator is not particularly limited, and any known ones may be used. Examples of typical radical polymerization initiators include diacyl peroxides such as benzoyl peroxide, p-chlorobenzoyl peroxide, decanoyl peroxide, lauloyl peroxide and acetyl peroxide; peroxy esters such as t-butyl peroxy-2-ethylhexanate, t-butyl peroxyneodecanate, cumyl peroxyneodecanate and t-butyl peroxybenzoate; percarbonates such as diisopropyl peroxydicarbonate and di-sec-butyl peroxydicarbonate; and azo compounds such as azobisisobutyronitrile.

The amount of the radical-polymerization initiator differs depending upon the polymerization conditions and the type of the initiator and the composition of the monomers, and cannot be specified generally. Generally, it is 0.001 to 10 parts by weight, preferably 0.01 to 5 parts by weight, per 100 parts by weight of the monomer component of the photochromic composition.

Of the polymerization conditions, the temperature affects the properties of the resulting photochromic resin. The temperature conditions are affected by the amount or the type of the initiator and the type of the monomers, and cannot be gerally limited. Generally, the polymerization is initiated at a relatively low temperature, the temperature is slowly raised, and at the end of polymerization, the composition is hardened at a high temperature (two-step polymerization of the tapered type). The polymerization time varies by various factors as the polymerization temperature does. Accordingly, the optimal time may be determined in advance according to these conditions. Generally, such conditions may preferably be selected so that the polymerization may be completed within 2 to 40 hours.

In the above polymerization, various stabilizers such as a mold releasing agent, an ultraviolet absorber, an ultraviolet stabilizer, an oxidation preventing agent, a coloration inhibiting agent, an antistatic agent, a fluorescent dye, a dye, a pigments, and a perfume, and additives may be used as required.

The mixed use of the ultraviolet stabilizer in the photochromic composition of this invention can further preferably increase the durability of the photochromic compound. In particular, since the fulgide compound has a large effect of increasing the durability by the addition of the ultraviolet stabilizer, when the fulgide compound is used as a mixture with the chromene compound, the intermediate color of these compounds can well prevent their change with the lapse of time.

Examples of the ultraviolet stabilizer are preferably hindered amine photostabilizers, hindered phenol photostabilizers, and sulfur-type antioxidants. Especially preferably used are hindered amine photostabilizers having a hindered amine structure in the molecule. Examples of such ultraviolet stabilizers are shown below.

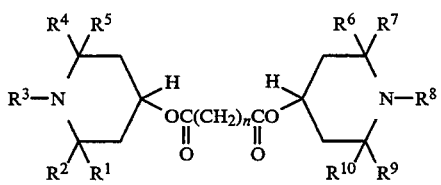
(A)

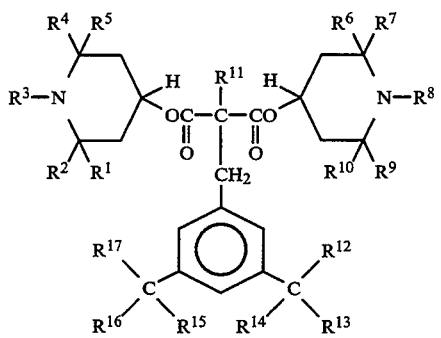
(B)

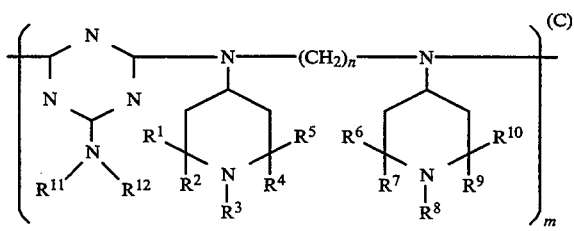
(C)

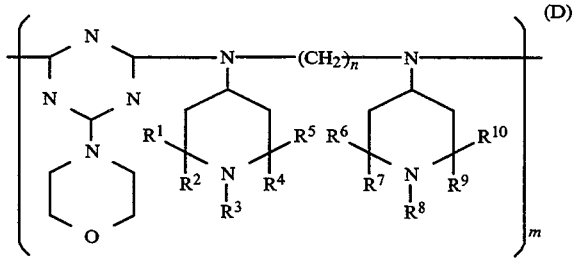
(D)

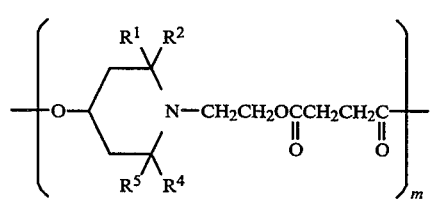
(E)

$(C_{26}H_{52}N_4)_m$ (F)

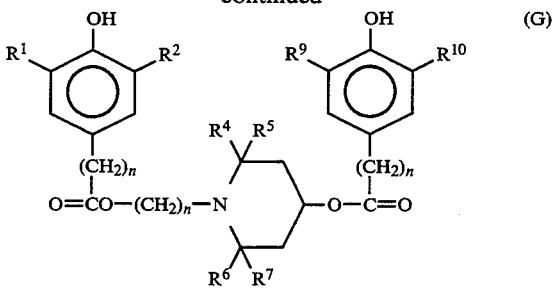
(G)

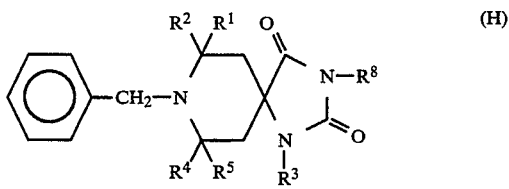
(H)

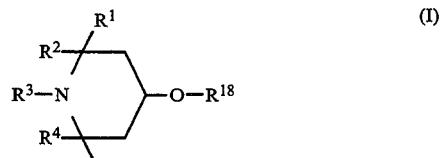
(I)

In formulae (A), (B), (C), (D), (E), (F), (G), (H), and (I), $R^1$, $R^2$, $R^4$, $R^5$, $R^6$, $R^7$, $R^9$, $R^{10}$, $R^{11}$, $R^{12}$, $R^{13}$, $R^{14}$, $R^{15}$, $R^{16}$ and $R^{17}$, are alkyl groups, $R^3$ and $R^8$ are hydrogen atom or an alkyl group, $R^{18}$ is a benzoyl group, an acryloyl group or a methacryloyl group, and m and n are positive integers.

In the above formular (A), (B), (C), (D), (E), (F), (G), (H) and (I), the carbon atoms of the alkyl groups are not particularly restricted. Generally, from the reason of the ease of obtaining these compounds, carbon atoms in a range of 1 to 12 are preferred.

Examples of the hindered amine photostabilizers are Sumisorb LS-2000 and LS-2001 (tradenames) made by SumitomoChemical Co., Ltd.

The amount of the ultraviolet stabilizer is not particularly restricted. Usually, it is 0.01 to 10,000 parts by weight, especially 1 to 1,000 parts by weight, per 100 parts by weight of the compound having at least one epoxy group in the molecule.

When a fulgide compound and a chromene compound are used conjointly, the addition of a phosphite ester compound can further restrain changes with the lapse of time of the mixed color of these compounds. Accordingly, when the fulgide compound and the chromene compound are conjointly used, the joint use of both the ultraviolet stabilizer and the phosphite ester compound in the above mixed system is the most preferred embodiment.

The phosphite ester compound may be any known compounds which are used in various plastics. In the present invention, to minimize changes of the color of the mixed color of the fulgide compound and the chromene compound and to prevent yellowing owing to deterioration by the fulgide compound, examples of preferably used phosphite ester compounds are shown by the following general formulae.

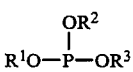
(J)

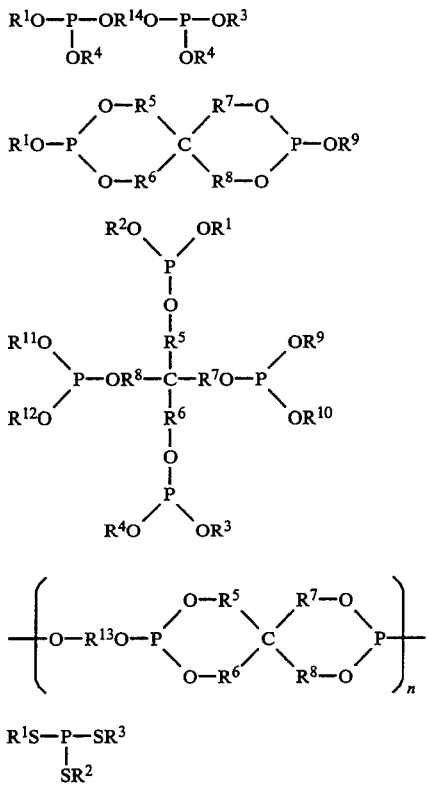

In the formulae (J), (K), (L), (M), (N) and (O), $R^1$, $R^2$, $R^3$, $R^4$, $R^9$, $R^{10}$, $R^{11}$ and $R^{12}$ are the same or different, and each represents a hydrogen atom, an aliphatic hydrocarbon group or an aromatic hydrocarbon group, $R^5$, $R^6$, $R^7$, $R^8$ and $R^{13}$ are the same or different and each represents an alkylene group, $R^{14}$ is an alkylene group or a group of the formula

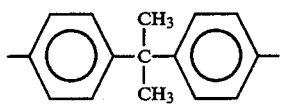

and n is a positive integer.

In the formulae (J) to (O), examples of the aliphatic hydrocarbon group are straight-chain, branched or cyclic alkyl groups having 9 to 18 carbon atoms, such as a nonyl group, a decyl group, an undecyl group, a dodecyl group, a tridecyl group, a tetradecyl group, a pentadecyl group, a hexadecyl group, a heptadecyl group and an octadecyl group. Examples of the aromatic hydrocarbon group are aryl groups having 6 to 15 carbon atoms such as a phenyl group, a tolyl group, a xylyl group, a t-butylphenyl group, or a 2,6-di-t-butyl-4-methylphenyl group. A methylene group is preferred as the alkylene group.

The amount of the phosphite ester compound is 0.01 to 10,000 parts by weight, preferably 1 to 1,000 parts by weight, per 100 parts by weight of the compounds having at least one epoxy group in the molecule.

The photochromic resin obtained by the above-mentioned method may be treated by the following methods according to its uses. It may be used by processings such as dyeing by using a dyestuff such as a disperse dyestuff, coating with a hard coating agent containing a silane coupling agent or with a hard coating agent having a sol of silicon, zirconium, antimony, aluminum, tin, or tungsten as a main component, evaporation with a thin coating of a metal oxide such as $SiO_2$, $TiO_2$, or $ZrO_2$, reflection-preventing treatment by the coating of a thin film of an organic polymer, and antistatic treatment, and secondary treatments.

By mixing the photochromic composition of this invention and a radical-polymerizable monomer and polymerizing the mixture, a photochromic resin having an excellent durability of the photochromic action can be obtained. When a compound having at least one radical-polymeriable group and at least one epoxy group in the molecule is used as the component (A) of the photochromic composition, a radical-polymerizable monomer is added as required and the mixture is polymerized to obtain a photochromic resin. In this case, by using a specified radical-polymerizable monomer, there can be obtained photochromic resins having a deep color-forming density, a fast color-fading density, an excellent transparency and surface hardness.

Accordingly, the resins obtained from the photochromic compositions of this invention are useful as organic glasses having photochromic property. They can be used, for example, as photochromic lenses preferably.

The following Examples are illustrated to explain the present invention specifically, but the invention is not limited to these examples.

The compounds used in the following Examples are shown below.

Compounds Having at Least One Epoxy Group in the Molecule

A: glycidyl methacrylate
B: glycidyl acrylate
C: β-methylglycidyl methacrylate
D: β-methyl glycidyl acrylate
E: bisphenol A monoglycidyl ether methacrylate
F: 4-glycidyloxybutyl methacrylate
G: 3-(glycidyl-2-oxyethoxy)-2-hydroxypropylmethacrylate
H: 3-(glycidyloxyl-1-isopropyloxy)-2-hydroxypropylacrylate
I: ethyleneglycolglycidylether
J: propylene glycolglycidylether
K: terephthalate diglycidylester
L: hydroquinonediglycidylether
M: butylglycidylether
N: 1,6-hexanedioldiglycidylether Radical-polymerizable Monomer A: triethylene glycoldimethacrylate
B: tetraethyleneglycoldimethacrylate
C: 2-hydroxyethylmethacrylate
D: benzyl methacrylate Fulgide Compounds A: N-cyanomethyl-6,7-dihydro-4-methyl-2-phenyl-spiro(5,6-benzo(b)thiophenedicarboximide-7,2-tricyclo(3,3,1,1$^{3.7}$)decane)
B: N-cyanomethyl-6,7-dihydro-2-(p-methoxyphenyl)-4-methylspiro-(5,6-benzo(b)thiophenedicarboximide-7,2-tricyclo(3,3,1,1$^{3.7}$)decane)
C: N-cyanomethyl-6,7-dihydro-4-methylspiro-(5,6-benzo(b)-thiophenedicarboximide-7,2-tricyclo(3,3,1,1$^{3.7}$)decane)

D: 6,7-dihydro-N-methoxycarbonylmethyl-4-methyl-2-phenylspriro(5,6-benzo(b)thiophenedicarboximide-7,2-tricyclo(3,3,1,1^{3.7})decane)

E: 6,7-dihydro-4-methyl-2-(p-methylphenyl)-N-nitromethylspiro(5,6-benzo(b)thiophenedicarboximide-7,2-tricyclo(3,3,1,1^{3.7})decane)

Chromene Compounds

A: spiro(norbornane-2,2'-(2H)benzo(h)-chromene)
S: spiro(bicyclo(3,3,1)nonane-9,2'-(2H)benzo(f)chromene)
C: 7'-methoxyspiro(bicyclo(3,3,1)nonane-9,2'-(2H)benzo(f)chromene)
D: 7'-methoxyspiro(norbornane-2,2'-(2H)benzo(f)chromene)
E: 2,2-dimethyl-7-octoxy(2H)benzo(h)-chromene

Hindered Amine Photostabilizers

A: Sanol LS-2626 (trademark: Sankyo Co., Ltd.)

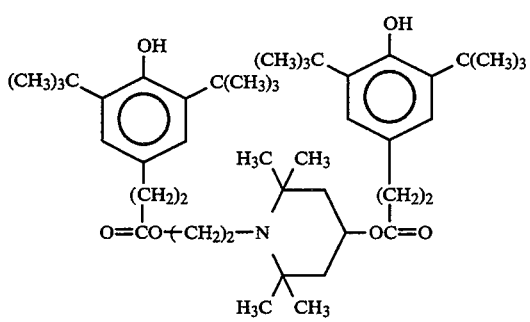

B: Sanol LS-744 (tradename: Sankyo Co., Ltd.)

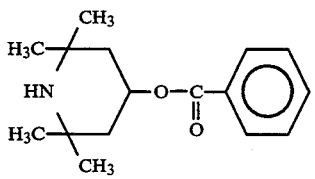

C: MARK LA-82 (treadename: Asahi Denka Co., Ltd.)

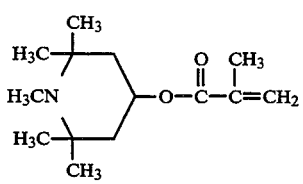

D: MARK LA-87 (tradename: Asahi Denka Co., Ltd.)

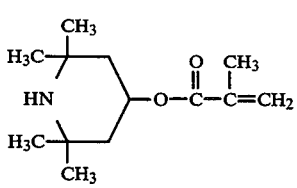

Phosphite Ester Compounds

A: 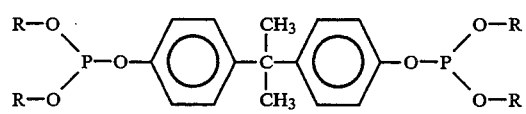

(R is an alkyl group having 9 to 18 carbon atoms)

B: $P-(O-C_{10}H_{21})_3$

C: 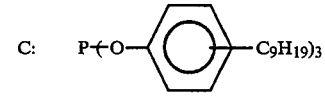

D: 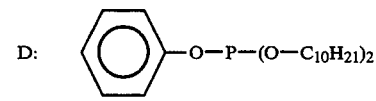

E: 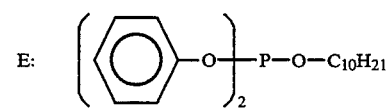

EXAMPLE 1

The compound having at least one epoxy group in the molecule shown in Table 1, the radical-polymerizable monomer, 0.5 parts by weight of A: N-cyanomethyl-6,7-dihydro-4-methyl-2-phenylspiro-(5,6-benzo(b)thiophenedicarboximide-7,2-tricyclo(3,3,1,1^{3.7})decane) as the fulgide compound, and 0.5 part by weight of t-butylperoxy-2-ethylhexanate as a radical-polymerization initiator were well mixed. The mixed liquid was poured into a mold cavity composed of a glass plate and a gasket of an ethylene-vinyl acetate to perform a casting polymerization. The polymerization was carried out by using an air furnace. The mixed liquid was gradually heated from 30° C. to 90° C. over a period of 18 hours, and held at 90° C. for 2 hours. After the end of the polymerization, the mold cavity was removed from the air furnace, and allowed to cool. Thereafter, the polymer was removed from the glass plate of the mold.

The photochromic properties of the resulting resin(-thickness 2 mm) are measured by the following methods. The results are shown in Table 1.

(1) Color-forming density

A mercury lamp SHL-100 supplied by Toshiba Kabushiki Kaisha was irradiated on the photochromic resin at 25° C.±1° C. for 60 seconds over a distance of 10 cm to color the resin. A value of $\epsilon(60\ seconds) - \epsilon(0\ second)$ was determined, and made a color-forming density. In the formula, $\epsilon(60\ seconds)$ is an absorbance of the photochromic resin after light irradiation of 60 seconds under the above conditions at a maximum absorption wavelength, and $\epsilon(0\ second)$ is an absorbance of a non-irradiated resin at a maximum absorption wavelength during light irradiation.

(2) Color-fading speed

In the measurement of a color-forming density, light was irradiated for 60 seconds, and then light irradiation was stopped. The time (seconds) during which the absorbance of the photochromic resin was decreased to ½ of $\epsilon(60\ seconds) - \epsilon(0\ second)$ was measured.

(3) Durability

A fatigue life was measured by Xenon Fade-Ometer FAC-25AX-HC supplied by Suma Tester Co., Ltd. The changed to those shown in Table 2. The results are shown in Table 2.

TABLE 2

| No. | Fulgide compound | Epoxy group-containing compound | Radical-copolymerizable monomer | $T_{\frac{1}{2}}$ (hours) | coloring density | Fading speed (sec.) | Percent transmission of light (%) | HL hardness |
| --- | --- | --- | --- | --- | --- | --- | --- | --- |
| 1 | B:0.5 | A:5  | A:65, B:15, C:15 | 290 | 1.2 | 175 | 91.1 | 91 |
| 2 | B:0.5 | A:10 | A:60, B:15, C:15 | 298 | 1.2 | 188 | 91.7 | 93 |
| 3 | C:0.5 | A:10 | A:60, B:15, C:15 | 320 | 1.2 | 199 | 91.7 | 93 |
| 4 | D:0.5 | A:10 | A:60, B:15, C:15 | 290 | 1.2 | 190 | 91.7 | 93 |
| 5 | E:0.5 | A; 10 | A:60, B:15, C:15 | 270 | 1.2 | 170 | 91.7 | 93 | fatigue life ($T_{\frac{1}{2}}$) is the time during which the absorbance at a maximum absorption wavelength based on the photochromic compound decreases to $\frac{1}{2}$ of the initial (T0) absorbance. Absorbances of $T_0$ and $T_{\frac{1}{2}}$ are values obtained by substracting the absorbance of a non-irradiated resin at a maximum absorption wavelength.

(4) Percent transmission of light

Percent transmission of light at 500 nm was measured by using a spectrophotometer 220A supplied by Hitachi Limited.

(5) Surface hardness

L-scale value of a test piece having a thickness of 2 mm was measured by using a Rockwell hardness tester.

EXAMPLE 3

In Example 1, 10 parts by weight of glycidyl methacrylate as the compound having at least one epoxy group in the molecule, 65 parts by weight of triethylene glycol dimethacrylate, 15 parts by weight of tetraethylene glycol dimethacrylate and 10 parts of 2-hydroxyethyl methacrylate as the radical-polymerizable monomers, 0.5 part by weight of the fulgide compounds shown in Table 3 and 0.2 parts by weight of the chromene compounds shown in Table 3. Otherwise, the same procedure as in Example 1 was repeated. The results are shonw in Table 3.

TABLE 3

| No. | Fulgide compound | Chromene compound | $T_{\frac{1}{2}}$ (hours) | Initial color | Color after 200 hours | Color-forming density | Fading speed (seconds) | Percent transmission of light (%) | HL hardness |
| --- | --- | --- | --- | --- | --- | --- | --- | --- | --- |
| 1 | A | A | 295 | gray | gray | 1.2 | 180 | 91.7 | 93 |
| 2 | A | B | 295 | gray | gray | 1.2 | 180 | 91.7 | 93 |
| 3 | A | C | 295 | gray | gray | 1.2 | 180 | 91.7 | 93 |
| 4 | A | D | 295 | gray | gray | 1.2 | 180 | 91.7 | 93 |
| 5 | A | E | 295 | gray | gray | 1.2 | 180 | 91.7 | 93 |
| 6 | B | B | 280 | gray | gray | 1.2 | 188 | 91.7 | 93 |
| 7 | B | D | 280 | gray | gray | 1.2 | 188 | 91.7 | 93 |
| 8 | C | B | 310 | amber | amber | 1.2 | 199 | 91.7 | 93 |
| 9 | D | B | 278 | amber | amber | 1.2 | 190 | 91.7 | 93 |
| 10 | E | B | 260 | amber | amber | 1.2 | 170 | 91.7 | 93 |

TABLE 1

| No. | Epoxy group-containing compound | Radical polymerizable monomer | $T_{\frac{1}{2}}$ (hours) | color-forming density | Fading speed (seconds) | Percent transmission of light (%) | HL hardness |
| --- | --- | --- | --- | --- | --- | --- | --- |
| 1  | A:1   | A:80, B:15, C:4   | 288 | 1.2 | 162 | 91.9 | 89 |
| 2  | A:10  | A:65, B:15, C:10  | 301 | 1.2 | 180 | 91.7 | 90 |
| 3  | A:50  | A:25, B:20, C:5   | 311 | 1.2 | 189 | 91.5 | 92 |
| 4  | A:1   | A:50, B:19, D:30  | 316 | 1.2 | 192 | 90.9 | 94 |
| 5  | A:10  | A:110, B:20, D:30 | 319 | 1.2 | 199 | 91.0 | 95 |
| 6  | A:50  | A:10, B:10, D:30  | 322 | 1.2 | 210 | 90.9 | 95 |
| 7  | B:10  | A:65, B:15, C:10  | 281 | 1.2 | 170 | 91.2 | 91 |
| 8  | C:10  | A:65, B:15, C:10  | 270 | 1.2 | 160 | 91.9 | 89 |
| 9  | D:10  | A:65, B:15, C:10  | 260 | 1.2 | 150 | 90.1 | 87 |
| 10 | E:1   | A:80, B:15, C:4   | 300 | 1.2 | 190 | 91.4 | 93 |
| 11 | E:5   | A:65, B:15, C:15  | 303 | 1.2 | 199 | 91.0 | 94 |
| 12 | E:10  | A:40, B:20, D:30  | 310 | 1.2 | 210 | 90.9 | 95 |
| 13 | F:5   | A:65, B:15, C:15  | 280 | 1.2 | 187 | 91.5 | 89 |
| 14 | G:5   | A:65, B:15, C:15  | 277 | 1.2 | 179 | 91.5 | 87 |
| 15 | I:5   | A:65, B:15, C:15  | 281 | 1.2 | 180 | 90.5 | 90 |
| 16 | I:5   | A:65, B:15, C:15  | 279 | 1.2 | 181 | 90.9 | 87 |
| 17 | J:5   | A:65, B:15, C:15  | 265 | 1.2 | 155 | 92.0 | 88 |
| 18 | K:5   | A:65, B:15, C:15  | 299 | 1.2 | 191 | 91.4 | 93 |
| 19 | L:5   | A:65, B:15, C:15  | 289 | 1.2 | 186 | 90.3 | 92 |
| 20 | M:5   | A:65, B:15, C:15  | 260 | 1.2 | 149 | 91.0 | 86 |
| 21 | N:5   | A:65, B:15, C:15  | 251 | 1.2 | 148 | 91.0 | 86 |

EXAMPLE 2

In Example 1, the same procedure as in Example 1 was repeated except that the fulgide compounds were

EXAMPLE 4

In Example 3, 0.5 part by weight of the hindered amine photostabilizers shown in Table 4 were used.

Otherwise, the same procedure as in Example 3 was repeated. The results are shown in Table 4.

TABLE 4

| No. | Fulgide compound | Chromene compound | Hindered amine compound | T½ (hours) | Initial color | Color after 250 hours | Color-forming density | Fading speed (seconds) | Percent transmission of light (%) | HL hardness |
|---|---|---|---|---|---|---|---|---|---|---|
| 1 | A | B | A | 310 | gray | gray | 1.2 | 183 | 91.7 | 93 |
| 2 | A | D | A | 309 | gray | gray | 1.2 | 183 | 91.7 | 93 |
| 3 | B | B | A | 301 | gray | gray | 1.2 | 192 | 91.7 | 93 |
| 4 | B | D | A | 298 | gray | gray | 1.2 | 192 | 91.7 | 93 |
| 5 | A | B | A | 299 | gray | gray | 1.2 | 183 | 91.7 | 93 |
| 6 | A | B | A | 298 | gray | gray | 1.2 | 183 | 91.7 | 93 |
| 7 | A | B | A | 295 | gray | gray | 1.2 | 183 | 91.7 | 93 |
| 8 | A | B | A | 290 | gray | gray | 1.2 | 183 | 91.7 | 93 |
| 9 | A | B | B | 312 | gray | gray | 1.2 | 183 | 91.7 | 93 |
| 10 | A | B | C | 309 | gray | gray | 1.2 | 183 | 91.7 | 93 |
| 11 | A | B | D | 301 | gray | gray | 1.2 | 183 | 91.7 | 93 |
| 12 | B | B | A | 299 | gray | gray | 1.2 | 192 | 91.7 | 93 |
| 13 | B | D | A | 298 | gray | gray | 1.2 | 192 | 91.7 | 93 |

EXAMPLE 5

In Example 3, 0.5 part by weight of the hindered amine photostabilizers and 0.5 part by weight of the phosphite ester compounds shown in Table 5 were added. Otherwise, the same procedure as in Example 3 was repeated. The results are shown in Table 5.

TABLE 5

| No. | Fulgide compound | Chromene compound | Hindered amine compound | Phosphite ester compound | T½ (hours) | Initial color | Color after 300 hours | Color-forming density | Fading speed (seconds) | Percent transmission of light (%) | HL hardness |
|---|---|---|---|---|---|---|---|---|---|---|---|
| 1 | A | B | A | A | 320 | gray | gray | 1.2 | 183 | 91.7 | 93 |
| 2 | A | D | A | A | 320 | gray | gray | 1.2 | 183 | 91.7 | 93 |
| 3 | B | B | A | A | 311 | gray | gray | 1.2 | 192 | 91.7 | 93 |
| 4 | B | D | A | A | 311 | gray | gray | 1.2 | 192 | 91.7 | 93 |
| 5 | A | B | A | B | 310 | gray | gray | 1.2 | 183 | 91.7 | 93 |
| 6 | A | B | A | C | 310 | gray | gray | 1.2 | 183 | 91.7 | 93 |
| 7 | A | B | A | D | 307 | gray | gray | 1.2 | 183 | 91.7 | 93 |
| 8 | A | B | A | E | 300 | gray | gray | 1.2 | 183 | 91.7 | 93 |
| 9 | A | B | B | A | 322 | gray | gray | 1.2 | 183 | 91.7 | 93 |
| 10 | A | B | C | A | 318 | gray | gray | 1.2 | 183 | 91.7 | 93 |
| 11 | A | B | D | A | 311 | gray | gray | 1.2 | 183 | 91.7 | 93 |
| 12 | B | B | A | A | 310 | gray | gray | 1.2 | 192 | 91.7 | 93 |
| 13 | B | D | A | A | 310 | gray | gray | 1.2 | 192 | 91.7 | 93 |

COMPARATIVE EXAMPLE 1

In Example 1, a compound having at least one epoxy group in the molecule was not used. Otherwise, 0.5 part by weight of the fulgide compounds shown in Table 6, and the same procedure as in Example 1 was repeated. The results are shown in Table 6.

TABLE 6

| No. | Fulgide compound | Radical-polymerizable monomer | T½ (hours) |
|---|---|---|---|
| 1 | A | A:80, B:15, C:4 | 130 |
| 2 | A | A:50, B:19, D:30 | 132 |
| 3 | B | A:80, B:15, C:4 | 106 |
| 4 | B | A:50, B:19, D:30 | 117 |
| 5 | C | A:80, B:15, C:4 | 140 |

What is claimed is:

1. A photochromic composition composed of (A) 100 parts by weight of a compound having at least one radical-polymerizable group and at least one epoxy group in the molecule and having the following general formula

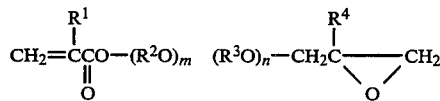

wherein each of $R^1$ and $R^4$ is a hydrogen atom or a methyl group and $R^2$ and $R^3$ represent an alkylene group having 1 to 4 carbon atoms which may be substituted by hydroxyl groups, or a group of

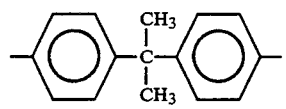

wherein m and n are 0 or 1, and
(B) 0.001 to 10,000 parts by weight of a photochromic compound.

2. A photochromic composition of claim 1 wherein the compound having at least one radical-polymerizable group and at least one epoxy group in the molecule is glycidyl methacryate, glycidyl acrylate, β-methylglycidyl acrylate, β-methyl-glycidyl methacrylate, bisphenol A monoglycidyl ether methacrylate, 4-glycidyloxybutyl methacrylate, 3-(glycidyl-2-oxyethoxy)-2-hydroxypropyl methacrylate, 3-glycidyloxy-1-isopropyloxy)-2-hydroxypropyl acrylate, 3-glycydyloxy-2-hydroxypropyl acrylate or 3-(glycidyloxy-2-hydroxypropyloxy)-2-hydroxypropyl acrylate.

3. A photochromic composition of claim 1 wherein the photochromic compound is a fulgide compound of the following formula

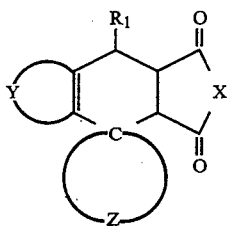

wherein

is a divalent aromatic hydrocarbon group or a divalent unsaturated heterocyclic group, wherein each group may contain a halogen atom, an alkyl group having 1 to 4 carbon atoms, an alkoxy group having 1 to 4 carbon atoms or an aryl group having 6 to 10 carbon atoms, $R^1$ is an alkyl group, an aryl group, or a monovalent heterocyclic group,

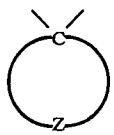

is a norbornylidene group or an admantylidene group, X is an oxygen atom, a group >N—$R_2$, a group >N—$A_1$—$B_1$-($A_2$)$_m$—($B_2$)$_n$—$R_3$, a group >N—$A_3$—$A_4$ or a group >N—$A_3$—$R_4$ in which $R_2$ is a hydrogen atom, an alkyl group or an aryl group, $A_1$, $A_2$ or $A_3$ are the same or different and each represents an alkylene group or an alkylidene group, a cycloalkylene group or an alkyl-cycloalkane-diyl group, $B_1$ and $B_2$ are the same or different and each amy represent

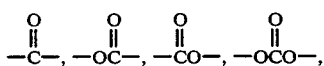

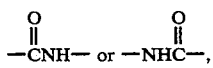

m and n are independently 0 or 1, and when m is 0, n is 0, $R_3$ is an alkyl group, a naphthyl group or a naphthylalkyl group, $A_4$ is a naphthyl group, and $R_4$ is a halogen atom, a cyano group or a nitro group.

4. A photochromic composition of claim 1 or 3 wherein the photochromic compound is a fulgide compound represented by the following formula

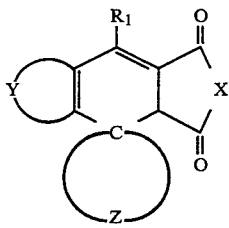 (II)

wherein

is a heterocyclic group, which may be substituted by an aryl group having 6 to 10 carbon atoms or an alkoxyaryl group having 7 to 14 carbon atoms, $R_1$ is an alkyl group having 1 to 14 carbon atoms,

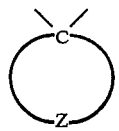

is an admantylidene group, and X is >N—R in which R represents a cyanoalkyl group having 1 to 4 carbon atoms or an alkoxycarbonylalkyl group having 3 to 9 carbon atoms.

5. A photochromic composition of claim 1 wherein the photochromic compound is composed of a combination of (1) a photochromic compound having a fulgide structure and (2) a photochromic compound having a chromene structure.

6. A photochromic composition of claim 1 wherein the photochromic compound (2) is a chromene compound of the following formula

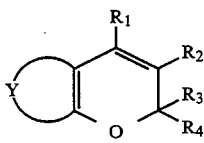

wherein $R_1$, $R_2$, $R_3$ amd $R_4$ are the same or different and each represents a hydrogen atom, an alkyl group, an aryl group, an amino group or a saturated heterocyclic group, $R_3$ and $R_4$ together may form a ring, and a group of the formula

may be an aromatic hydrocarbon group or an unsaturated heterocyclic group each of which may be substituted by an alkyl group having 1 to 20 carbon atoms and an alkoxy group having 1 to 20 carbon atoms.

7. The photochromic composition of claim 1 wherein the photochromic compound having a chromene structure is a chromene compound having the following formula

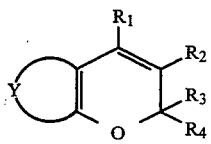

wherein $R_1$ and $R_2$ are both hydrogen atoms, $R_3$ and $R_4$ are the same or different alkyl groups having 1 to 4 carbon atoms, or together may form a bicyclo(3,3,1)9-nonylidene group or a norbornylidene group, and

is an aromatic hydrocarbon group which may be substituted by an alkyl group having 1 to 20 carbon atoms or an alkoxy group having 1 to 20 carbon atoms.

8. A photochromic composition comprising (A) 100 parts by weight of an epoxy compound having an epoxy group represented by general formula (I) and (B) 0.0001 to 10,000 parts by weight of a fulgide compound represented by general formula (II),

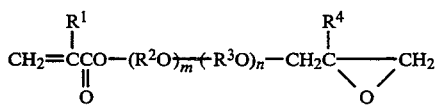  (I)

wherein each of $R^1$ and $R^4$ is a hydrogen atom or a methyl group and $R^2$ and $R^3$ represent the same or different alkylene groups having 1 to 4 carbon atoms which may be substituted by hydroxyl group, or a group of

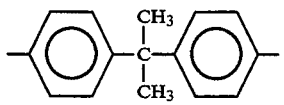

wherein m and n are 0 or 1,

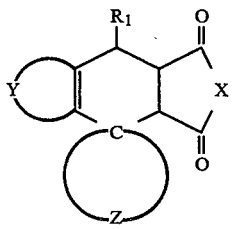  (II)

wherein

is a divalent aromatic hydrocarbon group containing a benzene group and fused rings of 2 or 3 benzene rings or containing a divalent unsaturated heterocyclic group having 5- to 7-membered rings containing 1 to 2 oxygen atoms, nitrogen atoms or sulfur atoms as ring-constituted atoms, or fused rings of said ring and a benzene ring, each of which may contain a member selected from halogen atoms, alkyl groups having 1 to 4 carbon atoms, alkoxy groups having 1 to 4 carbon atoms, aryl groups having 6 to 10 carbon atoms, alkoxyaryl groups having 7 to 14 carbon atoms, such as aryl groups having 6 to 10 carbon atoms substituted by alkoxy groups having 1 to 4 carbon atoms, amino group, nitro group, and cyano group, $R_1$ is an alkyl group having 1 to 4 carbon atoms, an aryl group having 6 to 10 carbon atoms, and a monovalent heterocyclic group having a 5- to 7-membered ring containing 1 to 2 oxygen atoms, nitrogen atoms or sulfur atoms as ring-constituted atoms or fused rings of the multi-membered ring and a benzene ring,

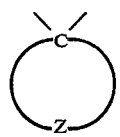

is a norbornylidene group or an adamantylidene group, X is an oxygen atom, a group $>N-R_2$, a group $>N-A_1-B_1-(A_2)_m-(B_2)_n-R_3$, a group $>N-A_3-A_4$ or a group $>N-A_3-A_4$ in which $R_2$ is a hydrogen atom, an alkyl group having 1 to 4 carbon atoms or an aryl group having 6 to 10 carbon atoms, $A_1$, $A_2$, or $A_3$ are the same or different and each represents an alkylene group having 1 to 4 carbon atoms or an alkylidene group having 2 to 4 carbon atoms, a cyclohexylene group or a dimethyl-cyclohexane-diyl group, $B_1$ and $B_2$ are the same or different and each may represent

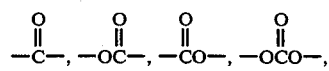

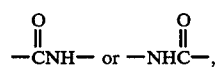

m and n are independently 0 or 1, and when m is 0, n is 0, $R_3$ is an alkyl group having 1 to 4 carbon atoms, a naphthyl group or a naphthylalkyl group having 11 to 14 carbon atoms, $A_4$ is a naphthyl group, and $R_4$ is a halogen atom, a cyano group or a nitro group.

9. A photochromic composition of claim 8 which comprises (A) 100 parts by weight of a compound having at least one epoxy group in the molecule, and (B) 0.1 to 1,000 parts by weight of a photochromic compound.

10. A photochromic composition of claim 8 which comprises (A) 100 parts by weight of a compound having at least one radical-polymerizable group and at least one epoxy group in the molecule, (B) 0.1 to 1,000 parts by weight of a photochromic compound, and (C) 10 to 100,000 parts by weight of a monomer copolymerizable with the (A).

11. A photochromic composition of claim 10 which comprises (A) 100 parts by weight of a compound having at least one radical-polymerizable group and at least one epoxy group in the molecule, (B) 0.1 to 1,000 parts by weight of a photochromic compound, and (C) 1 to 99,999 parts by weight of a monomer of the following formula (I)

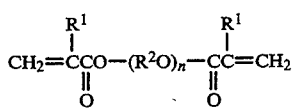

wherein R$^1$ is a hydrogen atom or a methyl group, R$^2$ is an alkylene group having 1 to 4 carbon atoms, or a group represented by the following formula

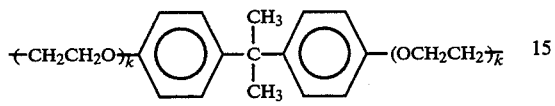

in which k is 0 or 1, and wherein n is an integer of 2 to 20, and 1 to 99,999 parts by weight of a monomer represented by the following formula (II)

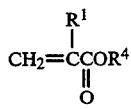

wherein R$^1$ is a hydrogen atom or a methyl group, and R$^4$ is an alkyl group having 1 to 4 carbon atoms which may be substituted by a hydroxyl group, an aryl group containing 6 to 10 carbon atoms which may be substituted by a halogen atom, or an aralkyl group containing 7 to 10 carbon atoms which may be substituted by a halogen atom; provided that the total amount of the monomer of formula (I) and the monomer of formula (II) is 10 to 100,000 parts by weight.

12. A photochromic composition of claim 8 which comprises
(A) 100 parts by weight of a compound having at least one epoxy group in the molecule,
(B) 0.1 to 1,000 parts by weight of a photochromic compound, and
(C) 0.01 to 10,000 parts by weight of an ultraviolet stabilizer and/or a phosphite ester compound.

13. A photochromic composition of claim 12 wherein the ultraviolet stabilizer is a hindered amine photostabilizer.

14. A photochromic composition of claim 8 wherein the photochromic compound is composed of a combination of (1) a photochromic compound having a fulgide structure and (2) a photochromic compound having a chromene structure.

15. A photochromic composition comprising (A) 100 parts by weight of an epoxy compound having an epoxy group represented by general formula (I) and (B) 0.0001 to 10,000 parts by weight of a fulgide compound represented by general formula (II), and (C) 0.001 to 10 parts by weight, per 100 parts by weight of the epoxy compound (A), of a radical-polymerization initiator,

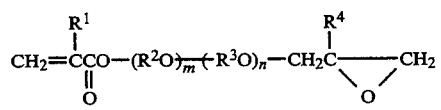

wherein each of R$^1$ and R$^4$ is a hydrogen atom or a methyl group and R$^2$ and R$^3$ represent the same or different alkylene groups having 1 to 4 carbon atoms which may be substituted by hydroxyl group, or a group of

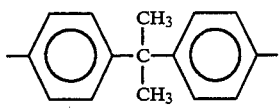

wherein m and n are 0 or 1,

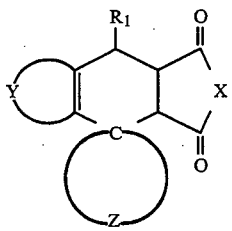

wherein

is a divalent aromatic hydrocarbon group containing a benzene group and fused rings of 2 or 3 benzene rings or containing a divalent unsaturated heterocyclic group having 5- to 7-membered rings containing 1 to 2 oxygen atoms, nitrogen atoms or sulfur atoms as ring-constituted atoms, or fused rings of said ring and a benzene ring, each of which may contain a member selected from halogen atoms, alkyl groups having 1 to 4 carbon atoms alkoxy groups having 1 to 4 carbon atoms, aryl groups having 6 to 10 carbon atoms, alkoxyaryl groups having 7 to 14 carbon atoms, such as aryl groups having 6 to 10 carbon atoms substituted by alkoxy groups having 1 to 4 carbon atoms, amino group, nitro group, and cyano group, R$_1$ is an alkyl group having 1 to 4 carbon atoms, an aryl group having 6 to 10 carbon atoms, and a monovalent heterocyclic group having a 5- to 7-membered ring containing 1 to 2 oxygen atoms, nitrogen atoms or sulfur atoms as ring-constituted atoms or fused rings of the multi-membered ring and a benzene ring,

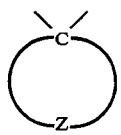

is a norbornylidene group or an adamantylidene group, X is an oxygen atom, a group >N—R$_2$, a group >N—A$_1$—B$_1$—(A$_2$)$_m$—(B$_2$)$_n$—R$_3$, a group >N—A$_3$—A$_4$ or a group >N—A$_3$—A$_4$ in which R$_2$ is a hydrogen atom, an alkyl group having 1 to 4 carbon atoms or an aryl group having 6 to 10 carbon atoms, A$_1$, A$_2$, or A$_3$ are the same or different and each represents an alkylene group having 1 to 4 carbon atoms or an alkylidene group having 2 to 4 carbon atoms, a cyclohexylene group or a dimethyl-cyclohexane-diyl group, B$_1$ and B$_2$ are the same or different and each may represent

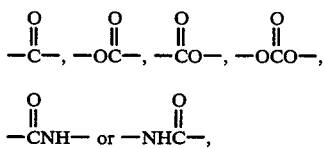

m and n are independently 0 or 1, and when m is 0, n is 0, $R_3$ is an alkyl group having 1 to 4 carbon atoms, a naphthyl group or a naphthylalkyl group having 11 to 14 carbon atoms, $A_4$ is a naphthyl group, and $R_4$ is a halogen atom, a cyano group or a nitro group.

16. A photochromic composition composed of (A) 100 parts by weight of a compound having at least one radical-polymerizable group and at lest one epoxy group in the molecular and having the following general formula

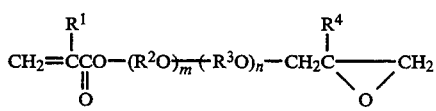

wherein each of $R^1$ and $R^4$ is a hydrogen atom of a methyl group and $R^2$ amd $R^3$ represent an alkylene group having 1 to 4 carbon atoms which may be substituted by hydroxyl groups, or a group of

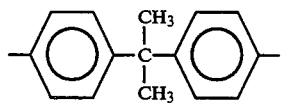

wherein m and n are 0 or 1, (B) 0.001 to 10,000 parts by weight of a photochromic compound being composed of a combination of (1) a photochromic compound having the following formula

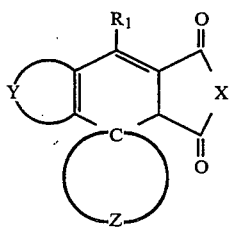

wherein

is a divalent aromatic hydrocarbon group or a divalent unsaturated heterocyclic group each of which may be substituted by a halogen atom, an ethyl group having 1 to 4 carbon atoms, an alkoxy group having 1 to 4 carbon atoms or an aryl group having 6 to 10 carbon atoms, $R^1$ is an alkyl group, an aryl group, or a monovalent heterocyclic group,

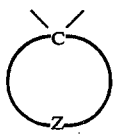

is a norbornylidene group or an adamantylidene group, X is an oxygen atom, a group $>N-R_2$, a group $>N-A_1-B_1-(A_2)_m-(B_2)_n-R_3$, a group $>N-A_3-A_4$ or a group $>N-A_3-R_4$ in which $R_2$ is a hydrogen atom, an alkyl group or an aryl group, $A_1$, $A_2$, or $A_3$ are the same or different and each represents an alkylene group or an alkylidene group, a cycloalkylene group or an alkylcycloalkane-diyl group, $B_1$ and $B_2$ are the same or different and each may represent

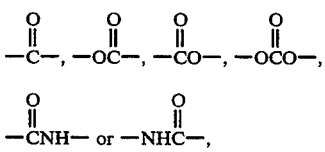

m and n are independently 0 or 1, and when m is 0, n is 0, $R_3$ is an alkyl group a naphthyl group or a naphthylalkyl group, $A_4$ is a naphthyl group, and $R_4$ is a halogen atom, a cyano group or a nitro group and (2) a photochromic compound having the following formula

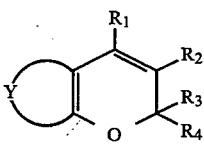

wherein $R_1$ and $R_2$ are both hydrogen atoms, $R_3$ and $R_4$ are the same or different alkyl groups having 1 to 4 carbon atoms, or together may form a cicyclo (3,3,1)9-nonylidene group or a norbornylidene group, and

is an aromatic hydrocarbon group which may be substituted by an alkyl group having 1 to 20 carbon atoms or an alkoxy group having 1 to 20 carbon atoms.

* * * * *